US011687633B2

(12) United States Patent
Kwatra et al.

(10) Patent No.: US 11,687,633 B2
(45) Date of Patent: Jun. 27, 2023

(54) ACCESS AUTHENTICATION IN AI SYSTEMS

(71) Applicant: INTERNATIONAL BUSINESS MACHINES CORPORATION, Armonk, NY (US)

(72) Inventors: Shikhar Kwatra, San Jose, CA (US); Christopher J. Hardee, Raleigh, NC (US); Sarbajit K. Rakshit, Kolkata (IN); Gurneet Kaur, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 428 days.

(21) Appl. No.: 17/090,091

(22) Filed: Nov. 5, 2020

(65) Prior Publication Data
US 2022/0138296 A1    May 5, 2022

(51) Int. Cl.
*H04N 21/4223* (2011.01)
*H04N 21/432* (2011.01)
(Continued)

(52) U.S. Cl.
CPC .............. *G06F 21/32* (2013.01); *G06N 20/00* (2019.01); *G06V 40/10* (2022.01); *G10L 17/22* (2013.01); *G06V 40/172* (2022.01)

(58) Field of Classification Search
USPC ........... 704/1–275; 706/1–62, 934, 900–903; 707/705–788; 726/1–30; 382/100–115,
(Continued)

(56) References Cited

U.S. PATENT DOCUMENTS 7,194,764 B2    3/2007    Martherus et al.
7,464,162 B2    12/2008    Chan
(Continued)

FOREIGN PATENT DOCUMENTS

CN    105760417 A    7/2016
CN    108268235 A    10/2018
CN    111353021 A    6/2020

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Marcellus J Augustin
(74) *Attorney, Agent, or Firm* — Cuenot, Forsythe & Kim, LLC

(57) ABSTRACT

Access authentication in an artificial intelligence system includes perceiving electronically with a first user's artificial intelligence voice response system (AIVRS) a physical presence of a second user. A voice request is generated by the first user's AIVRS and conveyed to a second user requesting access to a knowledge corpus stored by an AIVRS of the second user. Based on a voice response of the second user, the first user's AIVRS instantiates an electronic communications session with the second user's AIVRS. The session is initiated via an electronic communications connection with a portable device of the second user. Selected portions of the knowledge corpus are retrieved by the first user's AIVRS from the second user's AIVRS, the portions selected based on the voice response. An action by one or more IoT devices is initiated in response to a voice prompt interpreted by the first user's AIVRS based on the selected portions.

20 Claims, 6 Drawing Sheets

(51) Int. Cl.
*G06F 21/31* (2013.01)
*G06N 5/022* (2023.01)
*G10L 17/00* (2013.01)
*G10L 17/18* (2013.01)
*G06F 21/32* (2013.01)
*G10L 17/22* (2013.01)
*G06N 20/00* (2019.01)
*G06V 40/10* (2022.01)
*G06V 40/16* (2022.01)

(58) Field of Classification Search
USPC .................................................. 382/155–159
See application file for complete search history.

(56) References Cited

U.S. PATENT DOCUMENTS

| | | | |
|---|---|---|---|
| 7,640,574 | B1 | 12/2009 | Kim et al. |
| 9,038,170 | B2* | 5/2015 | Joshi ................... H04L 61/4523 |
| | | | 713/153 |
| 10,127,227 | B1 | 11/2018 | Badr et al. |
| 10,714,085 | B2 | 7/2020 | Miller et al. |
| 10,791,178 | B1* | 9/2020 | Srinivasa Ragavan ...................... |
| | | | G10L 15/22 |
| 10,795,332 | B2* | 10/2020 | Giorgi ................. H04L 12/2803 |
| 11,205,422 | B2* | 12/2021 | Kwatra ................... G10L 25/24 |
| 2008/0201191 | A1 | 8/2008 | Carter |
| 2010/0015975 | A1* | 1/2010 | Issa ..................... H04W 12/084 |
| | | | 709/228 |
| 2016/0196336 | A1 | 7/2016 | Allen et al. |
| 2018/0082682 | A1* | 3/2018 | Erickson .............. G05D 1/0094 |
| 2018/0190264 | A1 | 7/2018 | Mixter et al. |
| 2020/0075022 | A1* | 3/2020 | DeLuca ................. G10L 25/84 |
| 2020/0160856 | A1* | 5/2020 | Kline ...................... G06F 3/167 |
| 2020/0242494 | A1 | 7/2020 | McCawley et al. |
| 2021/0126985 | A1* | 4/2021 | Brush ..................... H04L 67/60 |

OTHER PUBLICATIONS

Deppen, L., "AI Software Market to Hit $78B by 2025, Here Are the Top Applications for the Technology," [online] ZDNET, A Red Ventures Company © 2020, Aug. 2, 2018, retrieved from the Internet: <https://www.techrepublic.com/article/ai-software-market-to-hit-78bby-2025-here-are-the-top-applications-for-the-technology/)>, 2 pg.

WO Appln. PCTCN2021124523, International Prepliminary Report on Patentability, International Search Report and Written Opinion, dated Jan. 14, 2022, 9 pg.

* cited by examiner

200

Perceive electronically with a first user's artificial intelligence (AI) voice response system a physical presence of a second user
202

Convey a voice request generated by the first user's AI voice response system requesting access to a knowledge corpus electronically stored by an AI voice response system of the second user and receive from the second user a voice response
204

Based on the voice response, instantiate by the first user's AI voice response system an electronic communications session with the second user's AI voice response system, the electronic communications session initiated by the first user's AI voice response system via an electronic communications connection with a portable device of the second user
206

Retrieve via a data communications network selected portions of the knowledge corpus by the first user's AIVRS from the second user's AIVRS, the selected portions of the knowledge corpus selected based on the voice response of the second user to the voice request conveyed by the first user's AIVRS
208

Initiate an action by one or more IoT devices in response to a voice command interpreted by the first user's AIVRS based on the selected portions of the knowledge corpus
210

FIG. 2

ACCESS AUTHENTICATION IN AI SYSTEMS

BACKGROUND

This disclosure relates to computer-based data exchange, and more particularly, to secure data access and exchange between computer systems endowed with artificial intelligence.

It is estimated that more than a million U.S. homes have automation systems, and the number of smart devices installed in U.S. homes is expected to soon surpass 50 million. Smart devices are endowed with artificial intelligence (AI) and can operate in accordance with the specific intents and preferences of users. A user's intents and preferences are part of a knowledge corpus that a smart device can acquire using machine learning. Smart devices increasingly communicate with one another and coordinate integrated functions via the Internet or other data communications networks, forming an Internet of Things (IoT).

SUMMARY

In one or more embodiments, a method includes perceiving electronically with a first user's artificial intelligence (AI) voice response system a physical presence of a second user. The method includes conveying a voice request generated by the first user's AI voice response system requesting access to a knowledge corpus electronically stored by an AI voice response system of the second user and receiving from the second user a voice response. The method includes instantiating by the first user's AI voice response system, based on the voice response, an electronic communications session with the second user's AI voice response system, the electronic communications session initiated by the first user's AI voice response system via an electronic communications connection with a portable device of the second user. The method includes retrieving via a data communications network selected portions of the knowledge corpus by the first user's AI voice response system from the second user's AI voice response system, the selected portions of the knowledge corpus selected based on the voice response of the second user to the voice request conveyed by the first user's AI voice response system. The method includes initiating an action by one or more IoT devices in response to a voice prompt interpreted by the first user's AI voice response system based on the selected portions of the knowledge corpus.

In one or more embodiments, a system includes a first user's artificial intelligence (AI) voice response system operatively coupled with a processor configured to initiate operations. The operations include electronically perceiving a second user's physical presence. The operations include conveying a voice request to access a knowledge corpus electronically stored by an AI voice response system of the second user and receiving a voice response from the second user. The operations include instantiating an electronic communications session by the first user's AI voice response system with the second user's AI voice response system, based on the voice response, the electronic communications session initiated via an electronic communications connection with a portable device of the second user. The operations include retrieving via a data communications network selected portions of the knowledge corpus from the second user's AI voice response system, the selected portions of the knowledge corpus selected based on the voice response of the second user to the request. The operations include initiating an action by one or more IoT devices in response to a voice prompt interpreted by the first user's AI voice response system based on the selected portions of the knowledge corpus.

In one or more embodiments, a computer program product includes one or more computer readable storage media having instructions stored thereon. The instructions are executable by a processor, operatively coupled to a first user's artificial intelligence (AI) voice response system, to initiate operations. The operations include electronically perceiving a second user's physical presence. The operations include conveying a voice request to access a knowledge corpus electronically stored by an artificial intelligence (AI) voice response system of the second user and receiving a voice response from the second user. The operations include instantiating an electronic communications session by the first user's voice response system with the second user's AI voice response system, based on the voice response, the electronic communications session initiated via an electronic communications connection with a portable device of the second user. The operations include retrieving via a data communications network selected portions of the knowledge corpus from the second user's AI voice response system, the selected portions of the knowledge corpus selected based on the voice response of the second user to the request. The operations include initiating an action by one or more IoT devices in response to a voice prompt interpreted by the first user's AI voice response system based on the selected portions of the knowledge corpus.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 is a flowchart of a method of securely accessing with one AI voice response system a knowledge corpus generated by another AI voice response system according to an embodiment.

DETAILED DESCRIPTION

Figure 1:
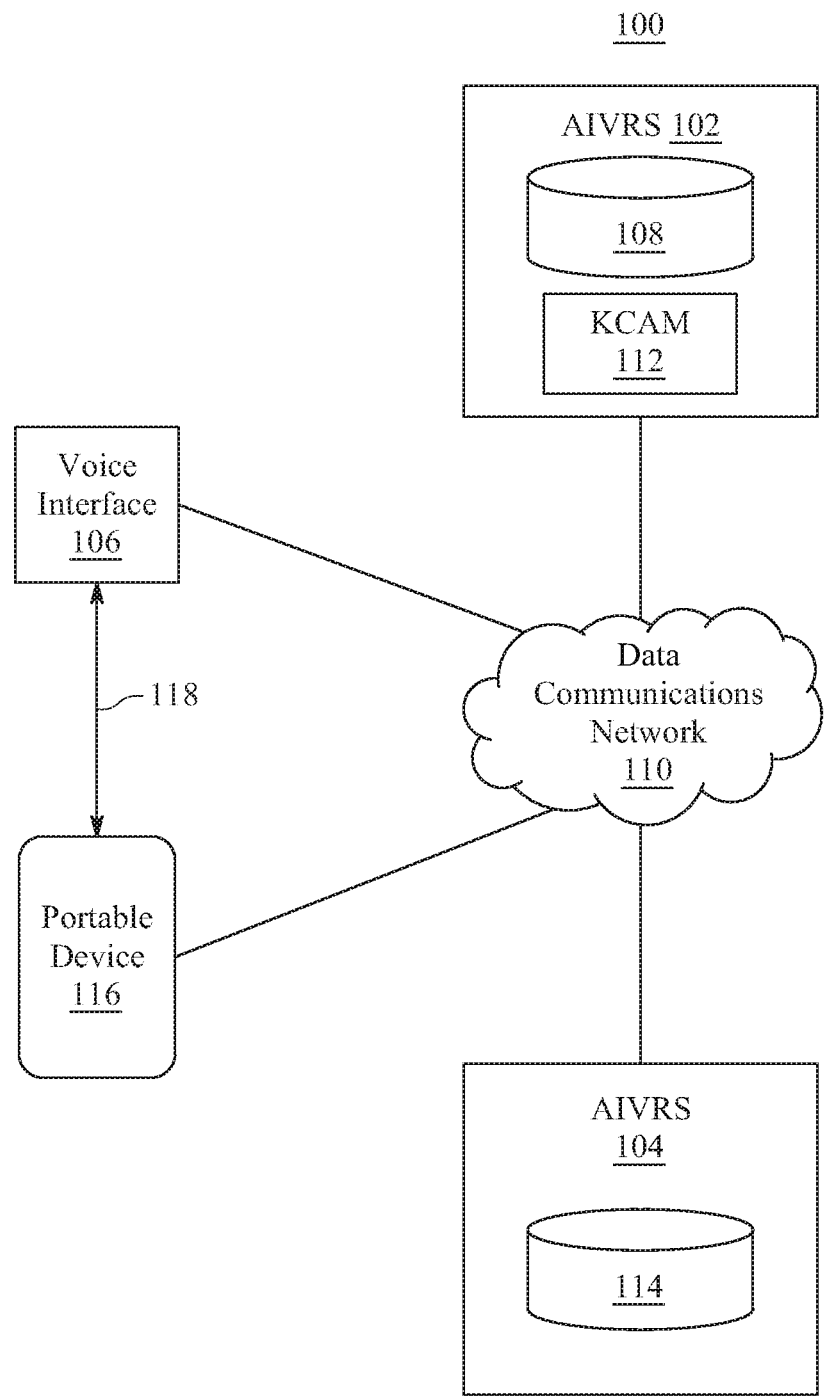
FIG. 1 depicts an example computing environment in which an AI voice response system is operative, the intelligent virtual assistance endowed with capability for securely accessing a remotely stored knowledge corpus according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer-based data exchange, and more particularly, to secure data access and exchange between computer systems endowed with artificial intelligence.

Automated systems and devices of various types, ranging from individual devices to multiple devices integrated in an IoT, are increasingly endowed with AI. Intelligent virtual assistants and chatbots, for example, implement natural language understanding (NLU) to create a human-computer interface with which linguistic structure and meaning can be machine-determined from human utterances.

AI voice response systems rely on knowledge corpora to recognize and execute voice, text, and/or voice-to-text prompts and commands for controlling voice-enabled AI systems and for responding to information queries. As defined herein, a "knowledge corpus" is a data structure comprising a collection of words, phrases, and sentences whose syntax and semantics express intents and preferences of an individual. Intents and preferences correspond, respectively, to verbal (voice or text) commands for causing a device to perform an action and a preferred way for the device to perform the action. For example, a verbal utterance such as "prepare Bill a cup of coffee the way he likes," comprises a command that an automated coffeemaker prepare a cup of coffee and preference that the coffee be prepared according to Bill's liking (e.g., strong, with cream, and no sugar). An AI voice response system that has constructed a knowledge corpus by "learning," using machine learning, from past usage to recognize the speaker and understand the syntax and semantics of the utterance can respond to the command by setting parameters of the automated coffeemaker according to Bill's preferences.

An "artificial intelligence voice response system (AIVRS)," as defined herein, is any system that provides an NLU computer-human interface with which linguistic structure and meaning are machine determined based on a human utterance for selecting, creating, and/or modifying data used to control an automated device or system and that uses machine learning to learn a device or system user's intents and preferences from processing user utterances, monitoring instances of user activities, and creating a corresponding history or pattern of usage of the device or system. An AIVRS can be implemented in software that executes on a cloud-based server, for example. The AIVRS executing on a cloud-based server can interact with a user by connecting via a data communications network (e.g., the Internet) to a smart speaker, for example. The smart speaker can comprise a speaker and a virtual assistant or chatbot to facilitate verbal interaction with a user of the AIVRS.

Different users will have different voice characteristics, use different utterances, and have different activity patterns, and hence, different knowledge corpora. A specific knowledge corpus typically corresponds to a specific individual. For reasons of privacy and/or data security, access to a specific user's knowledge corpus may be limited to the specific individual. While this protects privacy and provides security, such restriction can limit a user's ability to use another's AIVRS because someone else's AIVRS typically is precluded from accessing the former user's knowledge corpus. Without such access, another user's AIVRS does not know the user's intents and preferences and cannot recognize the user's commands or prompts. Consider, for example, a scenario in which an individual visits a friend's home or a colleague's office. The friend or colleague may invite the individual to use the friend or colleague's AIVRS to control, for example, a smart home or office IoT device based on the individual's personal choices regarding things like ambient temperature, lighting, background music, or amount of sugar in coffee prepared by an automated coffee machine. Without access to the individual's knowledge corpus, the individual cannot utilize the friend or colleague's AIVRS to control any of these automated functions.

An aspect of the systems, methods, and computer program products disclosed herein is instantiating a communication session between multiple AIVRS to facilitate dynamically providing selected portions of one user's knowledge corpus to another user's AIVRS. Provision of selected portions of the knowledge corpus enables a first user's AIVRS to capture intents and preferences learned by a second user's AIVRS and to respond to prompts and commands of the second user, while preserving the security of the second user's knowledge corpus.

In one arrangement, the first user's AIVRS recognizes that a command emanates from or pertains to the second user and that the AIVRS does not possess a knowledge corpus with respect to the second user to effectuate the command. The first user's AIVRS, accordingly, attempts to obtain the knowledge corpus (or relevant portions thereof) for effectuating the command by engaging a nearby portable device carried or worn by the second user (e.g., smartphone, smartwatch). If the first user's AIVRS determines that permission is needed and obtains permission from the second user, then the first user's AIVRS instantiates a communication session with an AIVRS of the second user to obtain access to selected portions of a knowledge corpus generated by the AIVRS of the second user. The first user's AIVRS can instantiate the communication session via a link over a data communications network.

The arrangements described herein are directed to computer technology and provide an improvement to existing computer technology. The arrangements improve computer technology by enabling an AIVRS to function efficiently on behalf of a wider array of users. Computer technology is further improved by reducing the communication overhead (e.g., message exchanges needed) to facilitate an AIVRS's acquisition of knowledge corpora to operate on behalf of the wider array of users. A further improvement is the exchange of relevant portions of knowledge corpora while preserving privacy the wider array of users and the security of the knowledge corpora corresponding to the wider array of users.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 5:
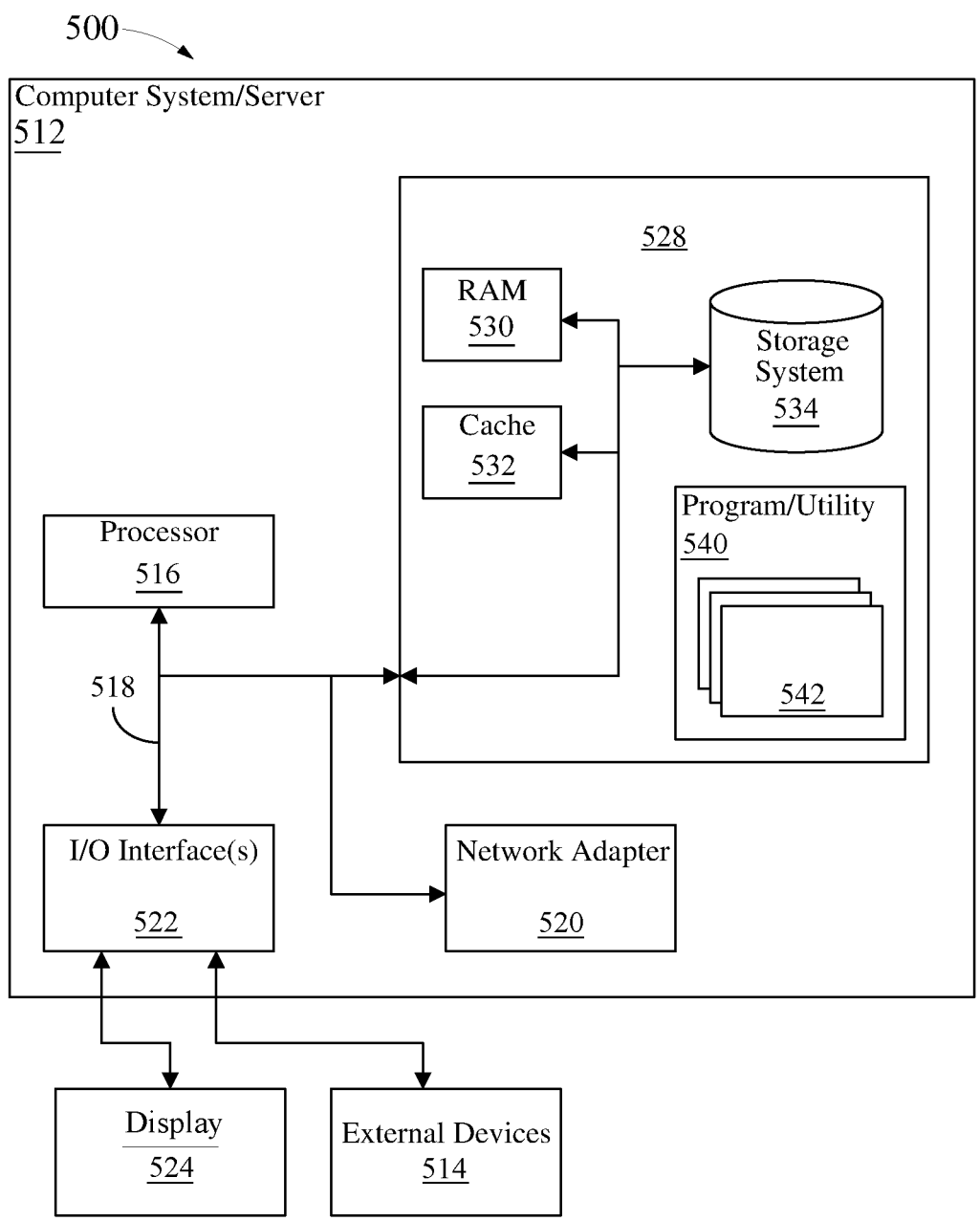
FIG. 5 depicts a cloud computing node according to an embodiment.

FIG. 1 depicts an example computing environment 100. Computing environment 100 illustratively includes AIVRS 102 and AVIRS 104. AIVRS 102 and AVIRS 104 can each be implemented in separate computer systems and/or separate computing nodes (not shown), such as computing node 500 (FIG. 5). Accordingly, each computing node can comprise, for example, a cloud-based server. Both AIVRS 102 and AIVRS 104 are illustratively implemented in software, which can be stored in the memory and can execute on one or more processors of one or more computer systems, such as computer system 512 of computing node 500. Illustratively, AIVRS 102 operatively couples to voice interface 106. Voice interface 106, in some embodiments, is a smart speaker that includes a speaker and an integrated virtual assistant for handling human-computer interactions and for controlling IoT devices (not explicitly shown) communicatively coupled to voice interface 106 via a wired or wireless connection (e.g., Wi-Fi, Bluetooth). Control of IoT devices is effectuated through various voice prompts and commands captured by voice interface 106 and recognized by AIVRS 102 based on knowledge corpus 108 created by AIVRS 102 to correspond to the user. Knowledge corpus 108 is illustratively stored on a memory of a computer system the same as or operatively coupled to the computer system on which AIVRS 102 executes.

AIVRS 102 can reside on a computer node (e.g., cloud-based server) remote from voice interface 106 and IoT devices operatively coupled to voice interface 106, and through voice interface 106, to AIVRS 102. In other embodiments, AIVRS 102, voice interface 106, and knowledge corpus 108 can be integrated in a single device having sufficient computing resources in terms of processing capability, memory storage, and the like to support each. Voice interface 106 and connected IoT devices can be located, for example, in a smart home or office of the user corresponding to knowledge corpus 108. In certain embodiments, in which AIVRS 102 and voice interface 106 are located remotely from one another, AIVRS 102 can operatively couple to voice interface 106 via data communications network 110. Data communications network 110 can be, and typically is, the Internet. Data communications network 110 can be, or include, a wide area network (WAN), local area network (LAN) or a combination of these and/or other types of networks and can include wired, wireless, fiber optic and/or other connections.

AIVRS 102 provides natural language understanding (NLU) with which linguistic structure and meaning can be machine-determined from human utterances received by voice interface 106. Voice commands and prompts received by voice interface 106 can be used to select, create, and modify electronic memory-stored data to control various automated systems and IoT devices (e.g., appliances, climate controller, lighting system, entertainment system, energy monitors). Voice interface 106 can provide voice output in response to voice input, the voice output also generated based on the linguistic structure and meaning of the voice input determined by the NLU provided by AIVRS 102.

AIVRS 102 iteratively builds, using machine learning, knowledge corpus 108 corresponding to a user based on the user's history or pattern of usage of different automated systems or IoT devices. AIVRS 102 stores the knowledge corpus as data stored in electronic memory. The electronic memory-stored data corresponding to the user is identified by an account and/or other credentials associated with the user. Different knowledge corpora can be created for different users based on the users' patterns of usage of automated systems and IoT devices, the knowledge corpora stored as data in the electronic memory of a cloud-based or other server. The unique identity of a user is determined by an AIVRS using voice-based recognition and authentication. Concurrently with or prior to construction of knowledge corpus 108, AIVRS 102 learns using machine learning to recognize the user to whom knowledge corpus 108 corresponds based on unique voice characteristics (e.g., acoustic signal patterns) of the user. In response to a command or prompt issued as a human utterance, AIVRS 102 (as do other AI voice response systems) identifies the user who voiced the command or prompt.

AIVRS 102 includes knowledge corpus accessor module (KCAM) 112. KCAM 112, illustratively, is implemented in software that executes on one or more processors of the computer system of the computing node in which AIVRS 102 is implemented. In other embodiments, KCAM 112 can be implemented in computer system remote from, but operatively coupled with, AIVRS 102. KCAM 112, in still other embodiments, can be implemented in dedicated circuitry or a combination of software and circuitry.

Operatively, in conjunction with other features of AIVRS 102, KCAM 112 enables a user to engage in voice interactions with AIVRS 102 notwithstanding that AIVRS has not constructed a knowledge corpus corresponding to the user. Although AIVRS 102 does not have a knowledge corpus corresponding to the user that would enable AVIRS 102 to recognize and implement the user's voice commands, there does exist knowledge corpus 114 corresponding to the user—albeit constructed by and operative with AIVRS 104, which is separate from AVIRS 102. AIVRS 104 may operate on a different computer system of a different computing node (e.g., cloud-based server) remote from AIVRS 102, but even if operating on the same computer system (e.g., cloud-based server), AIVRS 104 is distinct from AIVRS 102. KCAM 112 operating in conjunction with AIVRS 102 enables the user to nonetheless engage in voice interactions with AIVRS 102 by accessing selected portions of knowledge corpus 114 through AIVRS 104 and providing the selected portions to AVIRS 102 while preserving the security of knowledge corpus 114.

KCAM 112 detects the physical presence of the user for whom AIVRS 102 has no stored knowledge corpus. The user's physical presence can be detected according to one or more of the procedures described in detail below. KCAM 112 responds to detecting the user's physical presence by causing AIVRS 102 to generate a voice request to access a separately stored knowledge corpus corresponding to the user. AVIRS 102 conveys the voice request to the user through voice interface 106. If the user responds affirmatively with permission via a voice prompt received by AIVRS 102 through voice interface 106, KCAM 112 causes AIVRS 102 access the appropriate knowledge corpus by instantiating an electronic communications session with another AIVRS. For example, at the direction of KCAM 112, AIVRS 102 instantiates an electronic communications session with AVIRS 104 which contains knowledge corpus 114.

Figure 6:
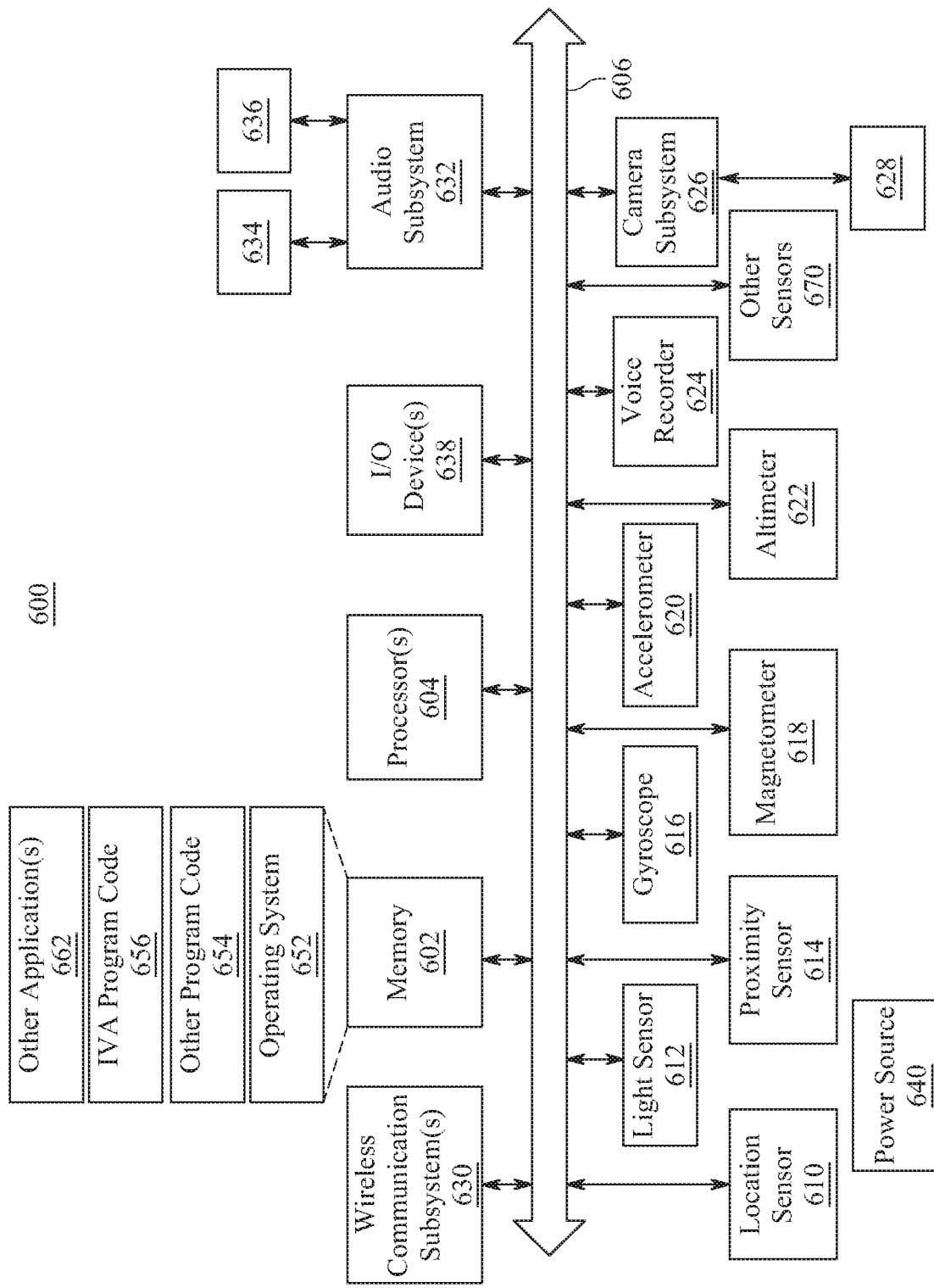
FIG. 6 depicts an example portable device according to an embodiment.

AVIRS 102 can initiate the electronic communications session via an electronic communications connection with portable device 116 of the user for whom AIVRS 102 has no stored knowledge corpus. Portable device 116 can be any device carried (e.g., smartphone) or worn (e.g., smartwatch) by the user. Portable device 116 can include one or more of the components of example portable device 600 (FIG. 6). The electronic communications connection can comprise wireless connection 118 between voice interface 106 and user's portable device 116, over which an authorization by the second user spoken into the portable device for conveyance to AIVRS 104 is wirelessly communicated to portable device 116. The electronic communications connection need not be primarily peer-to-peer. The electronic communications connection can comprise an authorization generated by AIVRS 104 and conveyed to AIVRS 102 over data communications network 110 (e.g., Internet), for example, in response to an authorization spoken by the second user into portable device 116. The authorization provides AIVRS 102 with information (e.g., IP address) for instantiating the electronics communications session.

Based on a user voice response received by voice interface 106 granting permission to access knowledge corpus 114, AVIRS 102 retrieves via data communications network 110 selected portions of the knowledge corpus 114 from AIVRS 104. Knowledge corpus 114, having been constructed by AIVRS 104, corresponds to the user, and the selected portions received by AIVRS 102 can be portions selected based on the user's voice response to the request KCAM 112 causes AIVRS 102 to generate and convey through voice interface 106.

By granting permission to selected portions of knowledge corpus 114, the user can command automated systems and IoT devices controlled by AIVRS 102 using utterances recognized by AIVRS 102 based on the selected portions of knowledge corpus 114 acquired from AIVRS 104

In a scenario involving two individuals in the same environment (e.g., smart home or office) comprising IoT devices that can be controlled by voice commands recognized by AIVRS 102, for example, knowledge corpus 108 may have machine learned to recognize commands voiced by only one of the users. AIVRS 102 may correspond to a first user and, having constructed knowledge corpus 108 by machine learning to recognize the voice and prompts of the first user may not recognize the voice and prompts of the second user. The first user, for example can be a regular (and legitimate) user, such as the owner (or family member) of the smart home or occupant of a smart office, where AIVRS 102 controls IoT devices by recognizing voice commands from the electronically stored data of knowledge corpus 108.

The second user (e.g., Bill) may be a guest or colleague of the first user (e.g., Abel) visiting the environment (e.g., smart home or office) in which IoT devices (e.g., automated coffeemaker) are voice controlled by AIVRS 102. If the first user (Abel) wakes AIVRS 102 with a voice prompt and utters the command "prepare Bill a cup of coffee, according to Bill's preferences," AIVRS 102 can accommodate the command only if AIVRS 102 has access to a knowledge corpus that includes the second user's (Bill's) coffee preferences. If AIVRS 102 cannot accommodate the command, KCAM 112 can directed AIVRS 102 to generate a voice output conveyed through voice interface 106 stating "I'm sorry, I don't know Bill's coffee preferences" and initiate the process for accessing an appropriate knowledge corpus to be able to respond effectively to the command.

Operatively, KCAM 112 can direct AIVRS 102 to perceive the presence of a second user, and KCAM 112 can determine whether a knowledge corpus corresponding to the second user is electronically stored as data in an electronic memory accessible by AIVRS 102. If so, AIVRS 102 can accommodate commands according to the second user's intents and preferences based on the electronically stored data comprising the knowledge corpus corresponding to the second user. Otherwise, KCAM 112 causes AIVRS 102 to generate a request requesting access to a knowledge corpus generated and stored by a different AIVRS and corresponding to the second user.

In certain embodiments, with access to selected portions of knowledge corpus 114, based on the context of the permission given via the second user's voice response, AIVRS 102 accesses data (e.g., intents and preferences) for creating an ontology graph tree for executing a given operation (e.g., automated coffee preparation). The ontology graph tree or other knowledge graph can be created by AIVRS 102, as directed by KCAM 112, by initially obtaining context data for resource authentication and by prompting AIVRS 104 for access. AIVRS 102 can fetch the selected portions of knowledge corpus 114 from AIVRS 104 and electronically store (at least temporarily) the selected portions. AIVRS 102 can create a pattern of usage corresponding to the second user based on the accessed portions of knowledge corpus 114. AIVRS 102, in certain embodiments, implements a deep learning neural network for recognizing usage patterns and intents and preferences. For example, AIVRS 102 can implement a bidirectional LSTM (a combination of a forward and a backward recurrent neural network useful for statistical learning of dependencies between discrete steps in a time series or data sequence (e.g., words in a sentence)). The bidirectional LSTM can be used with reasoning hop to include the pattern history and determine context data for the second user.

The second user, in giving permission to access separately stored knowledge corpus 114, can utter a command with access permission. AIVRS 104, which generated knowledge corpus 114, identifies the second user based on voice recognition and analyzes the second user's voice command. Based on the voice command, AIVRS 104 associated with knowledge corpus 114 identifies the selected portions to which access is granted by performing natural language processing. AIVRS 102, having gained access to the selected portions, can build a pattern history and intents and preferences and the like contained in the selected portions, thus enabling AIVRS 102 to respond to one or more voice commands of the second user (e.g., "prepare me a coffee the way I like my coffee") and/or of the first user with reference to the second user (e.g., "prepare Bill a coffee the way he likes his coffee").

KCAM 112, in distinct embodiments, can sense a physical presence of the second user in various ways. For example, as described above, a first user for whom AIVRS 102 has already created a knowledge corpus, may voice a command that references a second user for whom AIVRS 102 has not created a knowledge corpus. KCAM 112, using natural language processing, can determine that the reference is to a name (e.g., "Bill") that is not associated with a currently stored knowledge corpus and can initiate the knowledge corpus accessing process already described.

In other embodiments, KCAM 112 can distinguish, based on voice recognition, the voice of the first user for whom AIVRS 102 has already created a knowledge corpus and the voice of an individual, the second user, for whom no knowledge corpus is available to AIVRS 102. In still other embodiments, AIVRS 102 can operatively couple with one or more IoT cameras. Based on facial recognition applied to facial images captured by the one or more IoT cameras, KCAM 112 can distinguish between a first user whose facial image corresponds to someone for whom AIVRS 102 has already created a knowledge corpus and a second user whose facial image is of someone with whom AIVRS 102 has not previously interacted.

In any of the various scenarios, KCAM 112 can initiate the knowledge corpus accessing process already described in response to sensing the presence of a user for whom AIVRS 102 has no access to an existing knowledge corpus. For example, in an embodiment in which presence is sensed based on facial recognition, KCAM 112 can be configured to interact with one or more IoT cameras using a machine-to-machine communication protocol via representational state transfer application program interface (REST API) in order to determine visual context data using a fast convolutional neural network (fast-CNN). KCAM 112 directs creation of a knowledge graph by AIVRS 102 based initially on obtaining context data via the fast-CNN for resource authentication and generating a prompt to fetch selected portions of a separately stored knowledge corpus (e.g., knowledge corpus 114) and store (at least temporarily) selected intents and preferences of a corresponding user. KCAM 112 can direct AIVRS 102 to create a pattern history based on iterative application of a bidirectional-LSTM model used with reasoning hop to include the pattern history of the corresponding user, as well as intents and preferences based thereon, for responding to voice commands using the selected portions.

Optionally, once AIVRS 102 has been granted permission to access a remotely located knowledge corpus, the user granting permission can additionally authorize with a voice command that AIVRS 102 store (e.g., on cloud-based server) the selected portions for use in a subsequent session. The user granting permission, through the voice command, can specify specifically which portions can be stored and for how long. For example, the user can specify that the user's coffee brewing preferences be permanently accessible to AIVRS 102, but that certain other intents and preferences be discarded within a specified time (e.g., two hours). In a default mode, AIVRS 102 discards the retrieved selected portions of the knowledge corpus after a predetermined time interval lapses (e.g., 24 hours) without receiving a retention prompt (or other voice command) from the user granting initial access.

KCAM 112, in certain embodiments, only directs AIVRS 102 to initiate generation and conveyance of a corpus knowledge access request after first determining that a user whose presence is sensed is not associated with an already-stored knowledge corpus. Thus, for a user who has previously granted AIVRS 102 permission to store selected portions of a knowledge corpus, no new communication session need be instantiated between AIVRS 102 and another AIVRS to access a remotely stored knowledge corpus. In other embodiments, a user need not grant storage of selected portions of a knowledge corpus but may instead permit AIVRS 102 to store an active permission for instantiating a communication session and obtaining access to the knowledge corpus but only on a selective basis. Each session can be initiated in response to a voice command of the user for whom AIVRS 102 seeks access to a remotely located knowledge corpus. The voice command can specify selection of different portions of the knowledge corpus in each separate session.

For example, in any of the above scenarios regarding a second user, the second user having granted AIVRS 102 access to knowledge corpus 114 may additionally specify that AIVRS 102, in subsequent sessions, can again access knowledge corpus again but only in response to new voice prompts and only with respect to selected portions specified in each new prompt. Accordingly, in a latter session, the second user can voice a new prompt that grants AIVRS 102 access to the second user's coffee brewing preference for AIVRS 102 to use in controlling an automated coffee maker in response to the voice command. In a still latter session, the second user may voice permission for AIVRS 102 to again access knowledge corpus 114, but only with respect to selected portions pertaining to the second user's music preferences to enable AIVRS 102 to use in controlling an entertainment system in response to the second user's new voice command. In neither case, however, does AIVRS 102 have permission to store the respective preferences (coffee or music preferences) for more than a brief time to facilitate a real time or near-real time interaction.

KCAM 112, in some embodiments, can incorporate certain security features for the first user as well, that is, the user who regularly (and legitimately) interacts with AIVRS 102 and for whom AIVRS created knowledge corpus 108. In one arrangement, the first user can specify that AIVRS 102 never respond to certain specified voice commands of the second user, regardless of the second user's granting permission to access the second user's own knowledge corpus. For example, AIVRS 102 can be precluded (e.g., via separate voice command) from changing or disengaging a security system except in response to the first user's voice command. Additionally, KCAM 112 can enable the first user to create a circle of trust. The circle of trust specifies the identities (e.g., based on voice and/or facial recognition) and specific commands to which AIVRS 102 can respond based on who voices the command. The circle of trust, optionally, can be a tiered structure whereby different tiers of users are permitted to issue different types of voice commands. For example, visiting friends who provide access to their own knowledge corpora may have wider command latitude (e.g., first tier) than do mere acquaintances (e.g., second tier).

In some embodiments, KCAM 112 can search for publicly accessible knowledge corpora, or portions thereof, in advance of perceiving the presence of a user for whom AIVRS 102 has no existing knowledge corpus. KCAM 112 can initiate the search in response to data indicating a future presence of the individual for whom AIVRS 102 has no existing knowledge corpus. For example, KCAM 112 can be configured to intermittently (e.g., daily) search an IoT calendaring system. By searching the IoT calendaring system or other data source associated with the first user, KCAM 112 can obtain data (e.g., date and time) that a second user for whom AIVRS 102 has no existing knowledge corpus is expected to be within operative vicinity of the first user's IoT devices (e.g., within a smart home or office). KCAM 112 can search, for example, one or more databases of the first user (e.g., computer notes regarding prior encounters with the second user) or publicly accessible sites (e.g., social networking sites, professional or business organization websites associated) associated with the name of the second user in a search of publicly accessible intents and preferences of the second user.

The calendaring system or other data source associated with the first user can indicate the nature of the future presence of the second user. For example, the calendar may designate that the first user is meeting the second user socially or on business. KCAM 112 can initiate a search of publicly accessible knowledge corpora to identify the second user's intents and preferences regarding coffee and/or ambient temperature, as those are reasonably expected by KCAM 112 to be among the voice commands that the second user may permissibly provide to AIVRS 102. The intents and preferences can be stored by AIVRS 102 to respond to voice commands of the second user expressing a preference for coffee made by an automatic coffeemaker and/or temperature setting of a central air conditioning system, when the first user as host invites the second user to voice commands regarding coffee or temperature.

Optionally, in the absence of obtaining the information from publicly available knowledge corpora, KCAM 112 can prompt AIVRS 102 to generate and convey to the second user (e.g., via cellular phone or data communications network 116) a text or other electronic message such as an electronic mail requesting advance access to a knowledge corpus of an AIVRS (e.g., AIVRS 104) of the second user. Advance access enables AIVRS 102 to store intents and preferences of the second user for using during an upcoming interaction between the first and second user in the operational vicinity of voice interface 106.

FIG. 2 is a flowchart of method 200 of securely accessing by one AIVRS a knowledge corpus generated by another AIVRS according to an embodiment. Method 200 can be performed by a system comprising a KCAM operatively coupled with, or integrated in, a first user's AIVRS as described with reference to FIG. 1. The system, at block 202, electronically perceives with the first user's AIVRS a physical presence of a second user.

At block 204, the system conveys a voice request generated by the first user's AIVRS requesting access to a knowledge corpus electronically stored by an AIVRS of the second user. The system can receive from the second user a voice response. The voice response of the second user can grant access to the knowledge corpus electronically stored by the AIVRS of the second user.

At block 206, based on the voice response, the system instantiates with the first user's AIVRS an electronic communications session with the second user's AIVRS. The electronic communications session can be initiated by the first user's AIVRS via an electronic communications connection with a portable device of the second user. The portable device can be, for example, a smartphone, smartwatch, or other such device carried or worn by the second user. The electronic communications connection between the first user's AIVRS and the portable device can comprise a wireless connection between a voice interface of the first user's AIVRS and the portable device. An authorization by the second user spoken into the portable device for conveyance to the second user's AIVRS can be wirelessly communicated to the voice interface. The electronic communications connection can comprise an authorization conveyed by the portable device to the second user's AIVRS and the first user's AIVRS over a data communications network (e.g., Internet), for example. The authorization provides the first user's AIVRS the network information needed (e.g., IP address) for instantiating the electronic communications session.

At block 208, the system retrieves via a data communications network selected portions of the knowledge corpus by the first user's AIVRS from the second user's AIVRS. The selected portions of the knowledge corpus are selected based on the voice response of the second user to the voice request conveyed by the first user's AIVRS.

At block 210, the system initiates one or more actions by one or more IoT devices in response to a voice command (or other voice prompt). The voice command can be voiced by the second user or by the first user with reference to the second user. The voice command is interpreted by the first user's AIVRS based on the selected portions of the knowledge corpus.

In some embodiments, the system conveys the voice request in response to searching, by the first user's AIVRS, electronic memory-stored data and determining that the electronic memory-stored data lacks an electronically stored prior permission, as well as the selected portions of the knowledge corpus. The system retrieves the selected portions of the knowledge corpus via the data communications network in response to determining that the electronic memory-stored data includes an electronically stored prior permission and receiving a response to a request for access to the knowledge corpus. Responsive to determining that the electronic memory-stored data already includes the selected portions of the knowledge corpus, the system refrains from retrieving the selected portions via the data communications network.

In some embodiments, the system perceives the second user by recognizing a first user's voice prompt with the first user's AIVRS and identifying with the first user's AIVRS a reference to the second user whose identity is not previously known to the first user's AIVRS. The system additionally or alternatively, in certain embodiments, perceives the second user by performing visual recognition of the second user based on images captured by an IoT camera operatively coupled to the first user's AIVRS.

In some embodiments, the system can acquire second user information using the first user's AIVRS to capture data from a first user's device that is communicatively coupled to the first user's AIVRS. The data can correspond to intents and preferences of the second user (e.g., coffee brewing preferences) that the first user's AIVRS can use to respond to voice commands of the second user. For example, the first user's device can be a computer in which is stored an email exchange between the first user and second user in which the second user describes how the second user prefers coffee. Or, for example, the first user's device can be a smartphone in which is stored a text message in which the second user describes a favorite kind of music. The first user's AIVRS can use the data to build its own knowledge corpus for the second user, data that can be used by the first user's AIVRS to respond to a voice command requesting an automated coffeemaker prepare a coffee for the second user or a voice command from the second user requesting an entertainment system play music.

The system can discard the selected portions of the second user's knowledge corpus received by the first user's AIVRS. The system can automatically discard the selected portions if a predetermined time interval lapses without the system receiving a retention prompt from the second user. If the second user wishes the first user's AIVRS to electronically store the selected portion, the second user can voice a command specifying the duration for electronically storing the selected portion.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
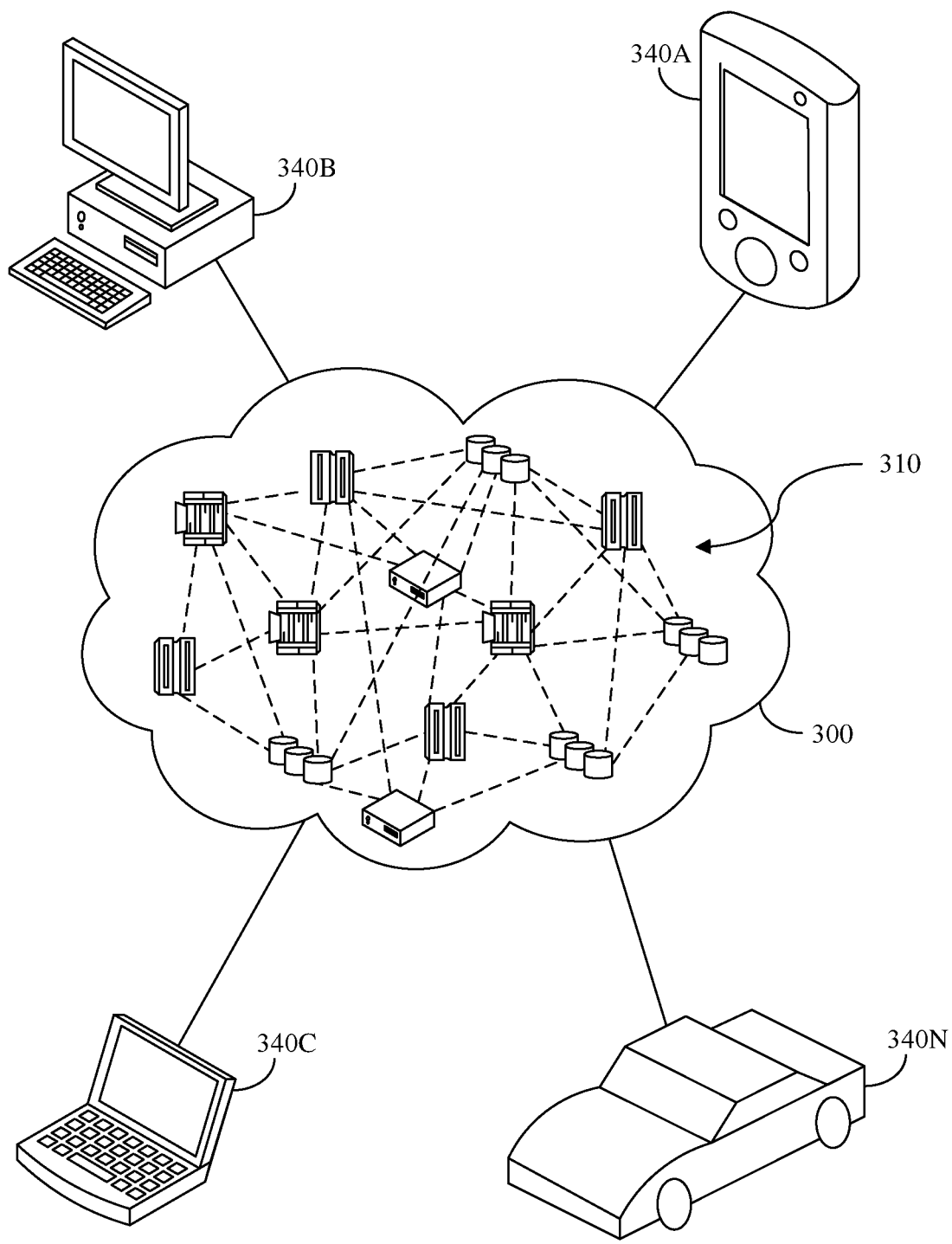
FIG. 3 depicts a cloud computing environment according to an embodiment.

Referring now to FIG. 3, illustrative cloud computing environment 300 is depicted. As shown, cloud computing environment 300 includes one or more cloud computing nodes 310 with which local computing devices used by cloud consumers, such as, for example, personal digital assistant (PDA) or cellular telephone 340a, desktop computer 340b, laptop computer 340c, and/or automobile computer system 340n may communicate. Computing nodes 310 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 340a-n shown in FIG. 3 are intended to be illustrative only and that computing nodes 310 and cloud computing environment 300 can communicate with any type of computerized device over any type of network and/or network addressable connection (e.g., using a web browser).

Figure 4:
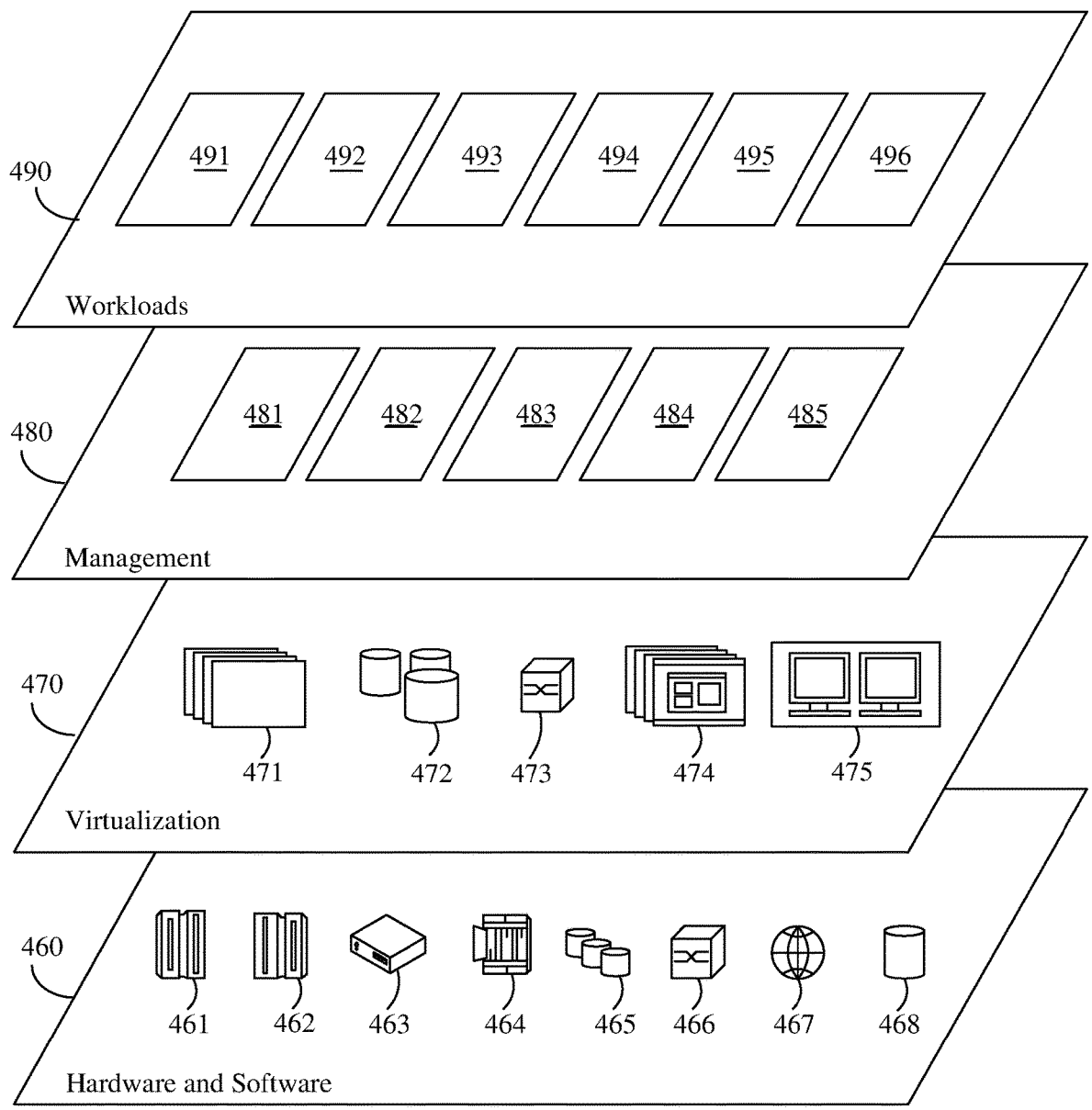
FIG. 4 depicts abstraction model layers according to an embodiment.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and AIVRS 496 in which a KCMA is integrated or with which the KCMA is operatively coupled.

FIG. 5 illustrates a schematic of an example of a computing node 500. In one or more embodiments, computing node 500 is an example of a suitable cloud computing node. Computing node 500 is not intended to suggest any limitation as to the scope of use or functionality of embodiments of the invention described herein. Computing node 500 is capable of performing any of the functionality described within this disclosure.

Computing node 500 includes a computer system 512, which is operational with numerous other general-purpose or special-purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors 516, a memory 528, and a bus 518 that couples various system components including memory 528 to processor 516. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 518 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 512 typically includes a variety of computer system-readable media. Such media may be any available media that is accessible by computer system 512, and may include both volatile and non-volatile media, removable and non-removable media.

Memory 528 may include computer system readable media in the form of volatile memory, such as random-access memory (RAM) 530 and/or cache memory 532. Computer system 512 may further include other removable/non-removable, volatile/non-volatile computer system storage media. By way of example, storage system 534 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. For example, one or more of the program modules may include AIVRS 596, portions thereof, in which a KCMA is integrated or operatively coupled to.

Program/utility 540 is executable by processor 516. Program/utility 540 and any data items used, generated, and/or operated upon by computer system 512 are functional data structures that impart functionality when employed by computer system 512. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via input/output (I/O) interfaces 522. Still, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

While computing node 500 is used to illustrate an example of a cloud computing node, it should be appreciated that a computer system using an architecture the same as or similar to that described in connection with FIG. 5 may be used in a non-cloud computing implementation to perform the various operations described herein. In this regard, the example embodiments described herein are not intended to be limited to a cloud computing environment. Computing node 500 is an example of a data processing system. As defined herein, "data processing system" means one or more hardware systems configured to process data, each hardware system including at least one processor programmed to initiate operations and memory.

Computing node 500 is an example of computer hardware. Computing node 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 500 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

FIG. 6 illustrates an example portable device 600 in accordance with one or more embodiments described within this disclosure. Portable device 600 can include a memory 602, one or more processors 604 (e.g., image processors, digital signal processors, data processors), and interface circuitry 606.

In one aspect, memory 602, processor(s) 604, and/or interface circuitry 606 are implemented as separate components. In another aspect, memory 602, processor(s) 604, and/or interface circuitry 606 are integrated in one or more integrated circuits. The various components of portable device 600 can be coupled, for example, by one or more communication buses or signal lines (e.g., interconnects and/or wires). In one aspect, memory 602 may be coupled to interface circuitry 606 via a memory interface (not shown).

Sensors, devices, subsystems, and/or input/output (I/O) devices can be coupled to interface circuitry 606 to facilitate the functions and/or operations described herein, including the generation of sensor data. The various sensors, devices, subsystems, and/or I/O devices may be coupled to interface circuitry 606 directly or through one or more intervening I/O controllers (not shown).

For example, location sensor 610, light sensor 612, and proximity sensor 614 can be coupled to interface circuitry 606 to facilitate orientation, lighting, and proximity functions, respectively, of portable device 600. Location sensor 610 (e.g., a GPS receiver and/or processor) can be connected to interface circuitry 606 to provide geo-positioning sensor data. Electronic magnetometer 618 (e.g., an integrated circuit chip) can be connected to interface circuitry 606 to provide sensor data that can be used to determine the direction of magnetic North for purposes of directional navigation. Accelerometer 620 can be connected to interface circuitry 606 to provide sensor data that can be used to determine change of speed and direction of movement of a device in three dimensions. Altimeter 622 (e.g., an integrated circuit) can be connected to interface circuitry 606 to provide sensor data that can be used to determine altitude. Voice recorder 624 can be connected to interface circuitry 606 to store recorded utterances.

Camera subsystem 626 can be coupled to an optical sensor 628. Optical sensor 628 can be implemented using any of a variety of technologies. Examples of optical sensor 628 include a charged coupled device (CCD), a complementary metal-oxide semiconductor (CMOS) optical sensor, and the like. Camera subsystem 626 and optical sensor 628 can be used to facilitate camera functions, such as recording images and/or video clips (hereafter "image data"). In one aspect, image data is a subset of sensor data.

Communication functions can be facilitated through one or more wireless communication subsystems 630. Wireless communications subsystem(s) 630 can include radio frequency receivers and transmitters, optical (e.g., infrared) receivers and transmitters, and so forth. The specific design and implementation of wireless communication subsystem(s) 630 can depend on the specific type of portable device 600 implemented and/or the communication network(s) over which portable device 600 is intended to operate.

For purposes of illustration, wireless communication subsystem(s) 630 may be designed to operate over one or more mobile networks (e.g., GSM, GPRS, EDGE), a Wi-Fi network that may include a WiMax network, a short-range wireless network (e.g., a Bluetooth network), and/or any combination of the foregoing. Wireless communication subsystem(s) 630 can implement hosting protocols such that portable device 600 can be configured as a base station for other wireless devices.

Audio subsystem 632 can be coupled to a speaker 634 and a microphone 636 to facilitate voice-enabled functions, such as voice recognition, voice replication, digital recording, audio processing, and telephony functions. Audio subsystem 632 is able to generate audio type sensor data. In one or more embodiments, microphone 636 may be utilized as a respirator sensor.

I/O devices 638 can be coupled to interface circuitry 606. Examples of I/O devices 638 include, for example, display devices, touch-sensitive display devices, track pads, keyboards, pointing devices, communication ports (e.g., USB ports), network adapters, buttons or other physical controls, and so forth. A touch-sensitive device such as a display screen and/or a pad is configured to detect contact, movement, breaks in contact, and the like using any of a variety of touch sensitivity technologies. Example touch-sensitive technologies include, for example, capacitive, resistive, infrared, and surface acoustic wave technologies, other proximity sensor arrays or other elements for determining one or more points of contact with a touch-sensitive device, and the like. One or more of I/O devices 638 may be adapted to control functions of sensors, subsystems, and such of portable device 600.

Portable device 600 further includes a power source 640. Power source 640 able to provide electrical power to various elements of portable device 600. In one embodiment, power source 640 is implemented as one or more batteries. The batteries may be implemented using any of a variety of different battery technologies, whether disposable (e.g., replaceable) or rechargeable. In another embodiment, power source 640 is configured to obtain electrical power from an external source and provide power (e.g., DC power) to the elements of portable device 600. In the case of a rechargeable battery, power source 640 further may include circuitry that is able to charge the battery or batteries when coupled to an external power source.

Memory 602 can include random access memory (e.g., volatile memory) and/or non-volatile memory, such as one or more magnetic disk storage devices, one or more optical storage devices, flash memory, and so forth. Memory 602 can store operating system 652, such as LINUX, UNIX, a mobile operating system, an embedded operating system, and the like. Operating system 652 may include instructions for handling system services and for performing hardware-dependent tasks.

Memory 602 may store additional program code 654. Examples of other program code 654 may include instructions to facilitate communicating with one or more additional devices, one or more computers, and/or one or more servers; graphic user interface processing; processing instructions to facilitate sensor-related functions; phone-related functions; electronic messaging-related functions; Web browsing-related functions; media processing-related functions; GPS and navigation-related functions; security functions; camera-related functions, including Web camera and/or Web video functions; and so forth. The program code can include program code for implementing in the portable device an intelligent virtual assistant (IVA), which is implemented in IVA program code 656 that executes on processor 604. The IVA can interact with an AIVRS executing, for example, on a remote cloud-based server. Memory 602 may also store one or more other applications 662.

The various types of instructions and/or program code described are provided for purposes of illustration and not limitation. The program code may be implemented as separate software programs, procedures, or modules. Memory 602 can include additional instructions or fewer instructions. Moreover, various functions of portable device 600 may be implemented in hardware and/or software, including in one or more signal processing and/or application-specific integrated circuits.

Program code stored within memory 602 and any data used, generated, and/or operated on by portable device 600 are functional data structures that impart functionality to a device when employed as part of the device. Further examples of functional data structures include, for example, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements within a memory. A data structure imposes physical organization on the data stored in the memory that is used by a processor.

In certain embodiments, one or more of the various sensors and/or subsystems described with reference to portable device 600 may be separate devices that are coupled or communicatively linked to portable device 600 through wired or wireless connections. For example, one or more (or all) of location sensor 610, light sensor 612, proximity sensor 614, gyroscope 616, magnetometer 618, accelerometer 620, altimeter 622, voice recorder 624, camera subsystem 626, audio subsystem 632, and so forth may be implemented as separate systems or subsystems that operatively couple to portable device 600 by way of I/O devices 638 and/or wireless communication subsystem(s) 630.

Portable device 600 can include fewer components than those shown or include additional components other than those shown in FIG. 6 depending on the specific type of system that is implemented. Additionally, the particular operating system and/or application(s) and/or other program code included may also vary according to system type. Moreover, one or more of the illustrative components can be incorporated into, or otherwise form a portion of, another component. For example, a processor may include at least some memory.

Portable device 600 is provided for purposes of illustration and not limitation. A device and/or system configured to perform the operations described herein may have a different architecture than illustrated in FIG. 6. The architecture may be a simplified version of portable device 600 and may include a processor and memory storing instructions. The architecture may include one or more sensors as described herein. Portable device 600, or a similar system, can collect data using the various sensors of the device or sensors coupled thereto. It should be appreciated, however, that portable device 600 may include fewer sensors or other additional sensors. With this disclosure, data generated by a sensor is referred to as "sensor data."

Example implementations of portable device 600 include, for example, a smartphone or other mobile device or phone, a wearable computing device (e.g., smartwatch), a dedicated medical device or other suitable handheld, wearable, or comfortably carriable electronic device, capable of sensing and processing sensor-detected signals and data. It will be appreciated that embodiments can be deployed as a stand-alone device or deployed as multiple devices in a distributed client-server networked system. For example, in certain embodiments, a smartwatch can operatively couple to a mobile device (e.g., smartphone). The mobile device may or may not be configured to interact with a remote server and/or computer system.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "individual," and "guest" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    perceiving electronically with a first user's artificial intelligence (AI) voice response system a physical presence of a second user;
    conveying a voice request generated by the first user's AI voice response system requesting access to a knowledge corpus electronically stored by an AI voice response system of the second user and receiving from the second user a voice response;
    based on the voice response, instantiating by the first user's AI voice response system an electronic communications session with the second user's AI voice response system, the electronic communications session initiated by the first user's AI voice response system via an electronic communications connection with a portable device of the second user;
    retrieving via a data communications network selected portions of the knowledge corpus by the first user's AI voice response system from the second user's AI voice response system, the selected portions of the knowledge corpus selected based on the voice response of the second user to the voice request conveyed by the first user's AI voice response system; and
    initiating an action by one or more IoT devices in response to a voice prompt interpreted by the first user's AI voice response system based on the selected portions of the knowledge corpus.

2. The method of claim 1, wherein the conveying is performed in response to searching, by the first user's AI voice response system, electronic memory-stored data and determining that the electronic memory-stored data lacks an electronically stored prior permission and the selected portions of the knowledge corpus.

3. The method of claim 1, further comprising:
    performing the retrieving selected portions of the knowledge corpus via the data communications network, in response to determining that the electronic memory-stored data includes an electronically stored prior permission; and
    responsive to determining that the electronic memory-stored data includes the selected portions of the knowledge corpus, refraining from the retrieving the selected portions via the data communications network.

4. The method of claim 1, wherein the perceiving comprises recognizing a first user's voice prompt by the first user's AI voice response system and identifying by the first user's AI voice response system a reference to the second user.

5. The method of claim 1, wherein the perceiving comprises performing visual recognition of the second user based on images captured by an IoT camera operatively coupled to the first user's AI voice response system.

6. The method of claim 1, further comprising acquiring second user information by the first user's AI voice response system based on data captured by the first user's AI voice response system from a first user's device communicatively coupled to the first user's AI voice response system.

7. The method of claim 1, wherein the first user's AI voice response system discards the retrieved selected portions of the knowledge corpus after a predetermined time interval lapses without receiving a retention prompt from the second user.

8. A system, comprising:
    a first user's artificial intelligence (AI) voice response system operatively coupled with a processor configured to initiate operations including:
        electronically perceiving a second user's physical presence;

conveying a voice request to access a knowledge corpus electronically stored by an AI voice response system of the second user and receiving a voice response from the second user;

based on the voice response, instantiating an electronic communications session by the first user's AI voice response system with the second user's AI voice response system, the electronic communications session initiated via an electronic communications connection with a portable device of the second user;

retrieving via a data communications network selected portions of the knowledge corpus from the second user's AI voice response system, the selected portions of the knowledge corpus selected based on the voice response of the second user to the request; and initiating an action by one or more IoT devices in response to a voice prompt interpreted by the first user's AI voice response system based on the selected portions of the knowledge corpus.

9. The system of claim 8, wherein the conveying is performed in response to searching electronic memory-stored data and determining that the electronic memory-stored data lacks an electronically stored prior permission and the selected portions of the knowledge corpus.

10. The system of claim 8, wherein the processor is configured to initiate further operations including:

performing the retrieving selected portions of the knowledge corpus via the data communications network, in response to determining that the electronic memory-stored data includes an electronically stored prior permission; and responsive to determining that the electronic memory-stored data includes the selected portions of the knowledge corpus, refraining from the retrieving the selected portions via the data communications network.

11. The system of claim 8, wherein the perceiving comprises recognizing a first user voice prompt and identifying within the voice prompt a reference to the second user.

12. The system of claim 8, wherein the perceiving comprises performing visual recognition of the second user based on images captured by a camera operatively coupled to the system.

13. The system of claim 8, wherein the processor is configured to initiate further operations including acquiring second user information based on data captured by a first user's device communicatively coupled to the system.

14. A computer program product, the computer program product comprising:

one or more computer-readable storage media and program instructions collectively stored on the one or more computer-readable storage media, the program instructions executable by a processor, operatively coupled with a first user's artificial intelligence (AI) voice response system, to cause the processor to initiate operations including:

electronically perceiving a second user's physical presence;

conveying a voice request to access a knowledge corpus electronically stored by an AI voice response system of the second user and receiving a voice response from the second user;

based on the voice response, instantiating an electronic communications session by the first user's AI voice response system with the second user's AI voice response system, the electronic communications session initiated via an electronic communications connection with a portable device of the second user;

retrieving via a data communications network selected portions of the knowledge corpus from the second user's AI voice response system, the selected portions of the knowledge corpus selected based on the voice response of the second user to the request; and initiating an action by one or more IoT devices in response to a voice prompt interpreted by the first user's AI voice response system based on the selected portions of the knowledge corpus.

15. The computer program product of claim 14, wherein the conveying is performed in response to searching electronic memory-stored data and determining that the electronic memory-stored data lacks an electronically stored prior permission and the selected portions of the knowledge corpus.

16. The computer program product of claim 14, wherein the program instructions are executable by the processor to cause the processor to initiate operations further comprising:

performing the retrieving selected portions of the knowledge corpus via the data communications network, in response to determining that the electronic memory-stored data includes an electronically stored prior permission; and responsive to determining that the electronic memory-stored data includes the selected portions of the knowledge corpus, refraining from the retrieving the selected portions via the data communications network.

17. The computer program product of claim 14, wherein the perceiving comprises recognizing a first user voice prompt and identifying within the voice prompt a reference to the second user.

18. The computer program product of claim 14, wherein the perceiving comprises performing visual recognition of the second user based on images captured by a camera operatively coupled to another user's AI voice response system.

19. The computer program product of claim 14, wherein the program instructions are executable by the processor to cause the processor to initiate operations further comprising acquiring second user information based on data captured by a first user device communicatively coupled to the first user's AI voice response system.

20. The computer program product of claim 14, wherein the program instructions are executable by the processor to cause the processor to initiate operations further comprising discarding the retrieved selected portions of the knowledge corpus after a predetermined time interval lapses without receiving a retention prompt from the second user.

* * * * *